METHOD OF COLD PRESSURE WELDING ELECTRICAL ENCLOSURE MEMBERS

Filed Aug. 30, 1961

Inventors
Myron L. Anthony
Robert F. Gill, Jr.
By Wallace, Kinzer and Dorn
Attorneys 3,139,678
Patented July 7, 1964

3,139,678

METHOD OF COLD PRESSURE WELDING ELECTRICAL ENCLOSURE MEMBERS

Myron L. Anthony and Robert F. Gill, Jr., La Grange, Ill., assignors to Scully-Anthony Corporation, La Grange, Ill., a corporation of Illinois Filed Aug. 30, 1961, Ser. No. 134,909
1 Claim. (Cl. 29—470.1)

This invention relates to a mode of joining metal surfaces by cold welding techniques, that is, the joining of metallic surfaces solely by the application of pressure of a forging order. The present invention is particularly applicable to the manufacture of an electrical enclosure, but is also applicable to other kinds of enclosures where a metallic base and a cap are to be permanently joined by pressure welding.

A typical electrical enclosure (the expression electrical is used herein generically to include electronic circuitry as well) is a capsule-like device wherein wire conductors or so-called pins are arranged in a base of cup-shaped configuration. These conductors are to be circuit-associated with an electrical component such as a transistor, a piezoelectric crystal, or the like, enclosed by a cap of cup-shaped configuration hermetically sealed to the aforesaid base. The base, the electrical component, the conductors and the cap complete the enclosure. The seal referred to is necessary in order to isolate the electrical component and maintain the pristine qualities thereof, but the difficulty in achieving the hermetic seal is that dirty adhesives or sloppy heat-bonding techniques such as thermal welding are of limited use, particularly in the instance of relatively small devices where contamination will upset the delicate nature of the encapsulated component.

It has been proposed that the base and the cap of the enclosure be initially shaped to have flat, engageable peripheral flanges to be joined by cold welding wherein the air-tight joint between the flanges is one obtained by molecular diffusion wrought by pressure alone. In preparing surfaces for cold welding, the prevalent thought has been that the flange surfaces to be joined should be thoroughly abraded to remove any oxides present, including the epidermal oxide of the metal of which the base and the cap are composed. In fact, somewhat involved surface preparation techniques of different kinds have been developed in the electrical enclosure art, solely on the basis of efficacious elimination of any oxide film, and extraordinary precautions are subsequently taken during manufacture to avoid an environment that might induce regeneration of an oxide surface. It is stipulated that the oxide-free parts should be cold welded before regeneration of an oxide surface. Such techniques are perhaps proper in connection with cold welding processes to be performed under circumstances where electrical conductivity and a great deal of mechanical strength is considered to be a major requirement, and where freedom from trace contamination, hermetic seal perforation and absence of microscopic voids are of secondary importance. Such techniques, especially abrading, are objectionable in connection with the pressure welding of enclosures where perfection in the hermetic juncture and avoidance of contamination of the interior are of prime importance.

It is believed that the uncertainty of perfection attendant to prior practices and the recognition by those skilled in the art of the costliness of cleaning enclosures, that must of necessity be employed subsequent to oxide removal techniques if practiced, have been a deterrent to general acceptance of cold welding techniques for joining the base and the cap in completing enclosures, particularly electrical enclosures. The cleaning step assumes, of course, the premise to be correct that oxides must be removed initially. Thus, the concept has been that a tedious and costly clean-up program must be employed as a necessary concomitant to the purging of oxides to expose the clean, bare or endometal incidental to the development of cold weld joints in electrical enclosures, but under the present invention it has been determined that avoidance of an oxide surface is unnecessary and in fact, can be deliberately encouraged to produce uniform, continuous, uncontaminated oxide surfaces in copper and aluminum parts resulting in more economy than heretofore in preparing surfaces for efficient cold welding.

Other and further objects of the present invention will be apparent from the following description and claims and are illustrated in the accompanying drawing which, by way of illustration, shows a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In preparing enclosure surfaces for cold welding under the present invention, the fabricated part of copper or aluminum is chemically cleaned at the exterior to expose the underlying clean, bare endometal surface easily susceptible to spontaneous oxidation, and this pure metal surface is then allowed to oxidize spontaneously to obtain a cold weldable surface characterized by a thin, continuous, uncontaminated film which is the oxide of the metal involved—copper oxide or aluminum oxide. It has been found that the oxide surface thus produced contributes to very effective cold welding, since it is a fact that for a given cold welding pressure under the present invention there is usually less reduction in thickness of the enclosure flanges (hereinafter identified) in comparison to enclosures purged of oxides before application of cold welding pressure. This, of course, means a sturdier joint, and it is believed that this is possibly due to the fact that the oxide surfaces are more brittle and penetrate one another effectively and, when engaged, display a galling action which prevents slippage between the surfaces at the time when the applied welding forces should be causing the surfaces to interpenetrate. In other words, the oxide surfaces, for one reason or another, constrain the sections being cold welded to move efficiently into one another.

Figure 1:
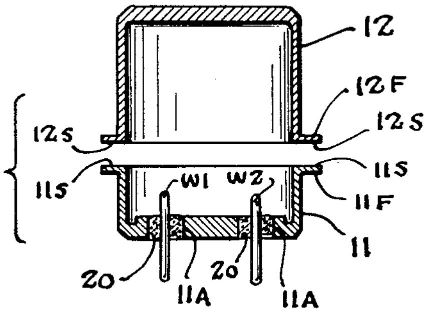
FIG. 1 is a view illustrating the parts of an electrical enclosure to be joined by cold welding techniques.
Figure 2:
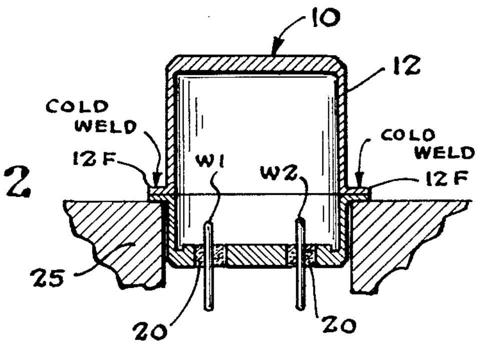
FIG. 2 is a view of the enclosure assembly during the performance of the cold welding operation.
Figure 3:
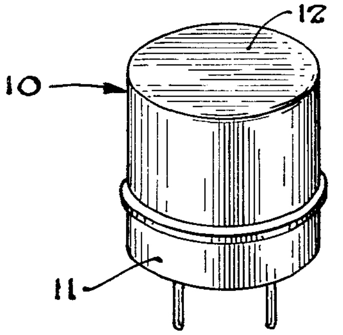
FIG. 3 is a perspective view of the completed enclosure.

The enclosure 10 illustrated in the drawing for illustrative purposes is an electrical enclosure merely representative of the sort of enclosures contemplated under the present invention since the present invention is applicable to other kinds of enclosures. The enclosure 10 is inclusive of a base 11 and a cap 12, both generally cup-shaped in section, and each enclosure member thus identified includes a peripheral flange 11F and 12F having flat engageable surfaces 11S and 12S that are to be engaged, as shown in FIG. 2, incidental to joining the flanges by way of cold pressure welding. The surfaces 11S and 12S in particular have beein specially treated and have developed thereon an oxide surface under and in accordance with the present invention, although it may be noted that the entire surface of each enclosure part is treated in the same manner.

It may be further noted that the base 11 includes wire conductors or so-called pins W1 and W2 that are rigidly related to the base 11 by vitrified glass seals 20 obtained by sintering in situ compacted glass powders. The seals 20 insulate the conductors from the walls 11A in the base which define the openings therein in which the conductors are located prior to filling the openings with the glass powders that are to afford the seals 20.

After the parts 11 and 12 have been processed under and in accordance with the present invention to develop the thin but highly continuous (non-porous) oxide surfaces thereon, and after the conductors have been secured in the base, the enclosure parts 11 and 12 are preferably preserved so that the oxide surfaces will be intact and in particular grease-free at the time cold welding is to be effected as shown in FIG. 2, and in particular free of grease or other hydrophobic or lubricating films. However, it may be noted that the oxide film of the endometal, once spontaneously generated, stops "growing" and prevents any further, impure oxide surface from originating.

When the parts are to be joined (the electrical component inside the enclosure is not shown in FIG. 2) the base 11 is associated with a fixture in a press that includes an anvil 25 on which the flange 11F of the base rests. Thereafter, the flange 12F of the cap 12 is complementally related to the flange on the base, and then a suitably configured plunger or indenting tool of desired shape is actuated to create sufficient welding pressure to cause the flanges 11F and 12F to be permanently united in accordance with accepted cold welding techniques.

The foregoing describes what can be viewed as the mechanical aspects of the present invention, and the description to follow will be devoted to a disclosure of the development of the oxide surfaces.

EXAMPLE 1.—COPPER PARTS

*Copper Oxide Surfaces*

The formation of the thin non-interrupted, non-porous layer of copper oxide is encouraged on copper electrical enclosure parts as 11 and 12 by the following procedure: The parts as 11 and 12 (having no electrical components or conductors) are first degreased as by being exposed to trichloroethylene vapor, or by two successive dips in trichloroethylene liquid. Other degreasing media can be used such as perchloroethylene, or a fluorinated solvent. This removes surface impurities that are solvent soluble. Thereafter, further and more penetrating cleaning (preferably using ultrasonic equipment) is effected by immersing the parts for not less than five minutes in a hot (80–95° C.) alkaline chelating cleaner typically having the following composition (aqueous):

| | | |
|---|---|---|
| $Na_3PO_4$ | grams per liter | 60 |
| Tetrasodium ethylene diamine tetracetate (34% aqueous solution) | ml. per liter | 74 |
| Liquid household washing detergent | do | 7.5 |

Following this, the parts are thoroughly rinsed in tap and distilled water successively, and then are chemically cleaned or polished as by being immersed for from one to five seconds in the following acid bath which results in exposure of the bare, clean, pristine copper endometal:

| | Parts by volume |
|---|---|
| $HNO_3$ (conc.) | 280 |
| $H_2SO_4$ (conc.) | 520 |
| Distilled water | 200 |

The acid treatment not only cleans the surface, but reduces it to a smoother state (less "hill and dale"—i.e., less specific area) and one more susceptible to auto-oxidation. It is also found that this acid treatment eventually results in an oxide surface which, once formed, resists any further oxidation. The parts after the acid treatment are drained free of acid, and the entailed time lapse for draining is counted and included in the above specified one to five second dip. After draining, the parts are thoroughly rinsed in tap water, finally rinsed in distilled water, and are set aside in a dust-free drying cabinet, free of lubricating, hydrophobic materials, to their spontaneously develop a uniform, continuous copper oxide surface. This surface as spontaneously developed is of the order of 0.0002" or less, and resists further oxidation so that spongy or softer oxides are not produced by any continuation of the part in the aforesaid atmosphere. Thereafter, the parts having the deliberately oxidized surface can be packaged in dust-free containers purged of lubricating and hydrophobic materials until the bases as 11 in particular are to have the conductors as W1 and W2 secured thereto and the electrical enclosure completed.

EXAMPLE 2.—ALUMINUM PARTS

*Aluminum Oxide Surfaces*

The typical degreasing, alkaline cleaning and rinsing steps set forth above in Example 1 are repeated, but the acidic treatment, rather than a dip, is a bath of five to fifteen minutes in concentrated nitric acid which develops the desired aluminum oxide film. The treatment with nitric acid involves an initial attack on or leaching of the aluminum surface, and then the nitric acid oxidizes the aluminum to $Al_2O_3$. The oxide surface need be no thicker than 0.0002", being substantially transparent.

EXAMPLE 3.—ALUMINUM PARTS

*Aluminum Oxide Surfaces*

The degreased and cleaned parts are made anodic at 60 to 80° F. in a sulphuric acid bath of 10 to 20% concentration by volume, using lead or carbon cathodes. The current density is 10 to 25 amperes per square foot. The time may run as high as 15 to 30 minutes, if a heavy oxide deposit is desired, but a much shorter time is adequate to achieve a high coefficient of friction and hardness which augment pressure weldability as noted hereinabove.

After anodizing, the parts are subjected to tap and distilled water rinses and may then be dried and preserved, preferably in clean containers having the attributes above mentioned. The porous aluminum oxide surface may be sealed, if desired, by boiling the rinsed parts in neutral distilled water for 10 to 20 minutes, but this is not necessary to insure weldability.

Anodizing (Example 3) is more difficult than the nitric acid process (Example 2) because small parts cannot be anodized in bulk, relying upon the electrical contact from part to part, due to the fact that as the anodic coat forms, it serves as an electrical insulator. Parts generally are therefore individually racked. It may be noted, however, that one advantage to the anodic treatment is in special applications where the enclosure parts are to be more roughly handled or exposed to a greater degree of contamination than can be possibly resisted by the thinner oxide film obtained from nitric acid oxidizing treatment.

EXAMPLE 4.—ALUMINUM PARTS

*Aluminum Oxide Surfaces*

This is another method of anodizing resulting in the formation of a harder, non-porous oxide coat. It is afforded in the manner of Example 3 and with the same electrolyte, but is conducted at a temperature of 25 to 32° F. with vigorous agitation and while maintaining the electrolyte saturated with carbon dioxide. The thickness of the oxide film is of the order of 0.0005" or less.

In the examples above, malleable aluminum alloys are contemplated when considering aluminum parts. It may be noted, however, that if an aluminum alloy is used which will form dark oxides when fired, as for instance in processing the ceramic seals 20, then the treatment with nitric acid (5 to 15 minutes) is a preliminary to anodizing to avoid the formation of such dark oxides.

In all of Examples 1 to 4, the oxide surface is stable and resists further oxidation, so that spongy or softer oxides are not produced by exposure to the ambient atmosphere.

The function of the deliberately introduced very thin layer of oxides on thoroughly cleaned surfaces appears to be that of increasing the galling action, or the coefficient of friction, and brittleness, so that, as the mating surfaces such as 11S and 12S are forced together by the indenting tools or pressure welding dies, these two surfaces increase their penetration into each other, or otherwise attain the degree of proximity between atoms or molecules which is required for a true homogeneous metallurgical bond. It may here be noted that dissimilar metals (e.g., copper to aluminum) may be joined using the principles of the present invention. Thus, a copper part will be treated as above described and an aluminum part as above described prior to joining the two by cold pressure welding. Thus, it appears that the increased friction between the two mating surfaces restricts the lateral flow of metal so that the surfaces to be joined are constrained to flow at right angles to their escape movement.

We claim:

In a method of assembling electrical enclosures including the step of cold pressure welding enclosure parts presenting aluminum surfaces where the weld joints are to be formed between opposed enclosure parts, chemically cleaning each such aluminum surface that is to be part of a weld joint between opposed enclosure parts thereby to expose the bare pure aluminum metal for effective deliberate oxidation, deliberately developing a substantially continuous aluminum oxide surface from said bare pure aluminum by treatment thereof with nitric acid, preserving intact each such aluminum oxide surface until welding is to be effected thereon, and thereafter completing cold pressure weld joints for said enclosure parts, which joints embrace the aluminum oxide surfaces deliberately formed aforesaid by means of nitric acid treatment.

References Cited in the file of this patent

UNITED STATES PATENTS

| | | |
|---|---|---|
| 2,541,083 | McDermott | Feb. 13, 1951 |
| 2,671,717 | Ferguson | Mar. 9, 1954 |
| 3,020,454 | Dixon | Feb. 6, 1962 |

FOREIGN PATENTS

| | | |
|---|---|---|
| 599,167 | Canada | May 31, 1960 |